July 3, 1934.  H. M. S. BINNS  1,964,972

METHOD OF MAKING CUTTING TOOLS

Filed Feb. 20, 1930

Inventor
HENRY MARTIN STANLEY BINNS

By  HK Parsons
Attorney

Patented July 3, 1934

1,964,972

UNITED STATES PATENT OFFICE 1,964,972

METHOD OF MAKING CUTTING TOOLS

Henry Martin Stanley Binns, Cincinnati, Ohio, assignor to The Cincinnati Milling Machine Company, Cincinnati, Ohio, a corporation of Ohio Application February 20, 1930, Serial No. 430,067

3 Claims. (Cl. 76—101)

This invention relates to a method of making cutting tools and more particularly to that class of tools which have a body portion of relatively inexpensive material such as carbon steel, for instance, and an inserted portion or cutting tip of relatively hard expensive cutting material.

In tools of this class, the materials generally used for the inserted portion or cutting tip, herein known as low oxidizable materials, have been of such a nature that they will withstand the higher temperatures necessary to a welding or brazing operation without any injurious effects thereto from oxidation, while the new materials, to be known herein as the high oxidizable materials, such as cemented tungsten carbide, for instance, are materially injured when subjected to such heats, due to excessive oxidation or burning.

The circumstances attending the uniting to a supporting body of a cutting tip of one of these high oxidizable materials are quite different from those attending the uniting to a supporting body of a low oxidizable material. This greater affinity for oxygen of one or more of the elements of these high oxidizable materials has necessitated the use of different methods for affixing cutting tips of these materials, than are available for affixing the cuttting tips of the low oxidizable materials.

The methods developed so far for accomplishing this purpose have been expensive, requiring special apparatus, and it is therefore an object of this invention to provide a new method of affixing tips of high oxidizable materials to cutting tools, which may be performed with the same apparatus that is now available for affixing tips of low oxidizable materials without causing injury thereto.

Another object of this invention is the provision of a new and improved method of welding or brazing a cutting tip of high oxidizable material to a tool body, which may be carried out in an oxidizing atmosphere.

Other objects and advantages of the present invention should be readily apparent by reference to the following specification, considered in conjunction with the accompanying drawing forming a part thereof, but it is to be understood that any modifications may be made in the specific structural details hereinafter disclosed, within the scope of the appended claims, without departing from or exceeding the spirit of the invention.

Referring to the drawing, in which like reference numerals indicate like parts:

Figure 1:
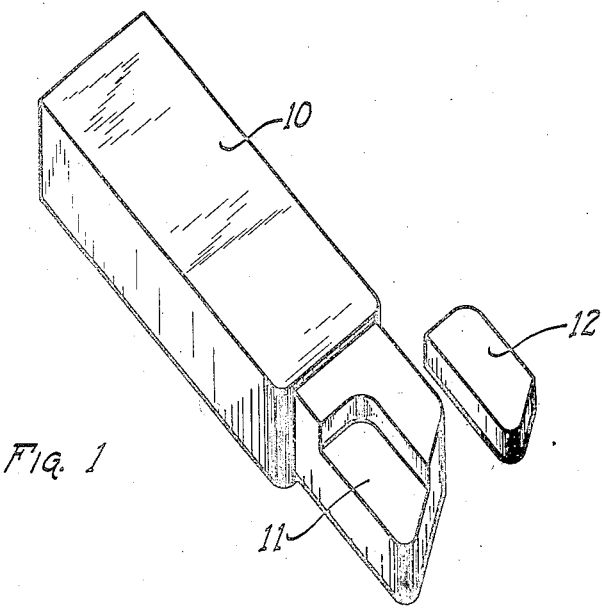
Figure 1 shows one type of cutting tool with the inserted portion detached.

In order to illustrate this invention, a lathe tool such as shown in Figure 1 may be taken as an example. In this case, the tool 10 has the pocket 11 formed therein, which is shaped to receive the cutting tip 12 made of cemented tungsten carbide or other high oxidizable material. The shank of the tool may be of any inexpensive material suitable for supporting a cutting tip and adapted to combine with a brazing material or hard solder. In carrying out the method, the parts are first cleaned so that they have a chemically clean surface, which may be accomplished by polishing the contactual surfaces. The cutting tip 12 is then electroplated on the exposed surfaces or all over, at relatively cold temperatures such as room temperature with copper or any other protective material which will prevent oxidation of the cutting tips when subjected to the high temperature of the brazing operation. A flux is applied to the parts and they are assembled, after which they are preferably subjected to a pre-heat of about 1600 degrees F. This may be accomplished by means of a gas fired furnace, electric furnace or an acetylene torch. After the parts have been saturated with heat at this temperature, they are transferred to a high heat zone, which may be in the form of another furnace having a temperature at least as high as the melting point of the solder. The parts are only left in this high heat zone long enough for the solder and flux to melt. As soon as the melting takes place, the tool is immediately transferred to a mechanical press, where the parts are pressed together and held until the solder has set. The tool may then be removed and the cutting tip ground to a cutting edge. In this grinding or sharpening operation, the thin copper plating will be removed.

In carrying out this process, it is not necessary to treat the contactual surfaces of the pocket 10 but if it is desired to cover these surfaces with the brazing material, a thin sheet of the material, such as copper, may be inserted between the tip and the bottom of the pocket when assembled, or the surfaces may be electroplated with the brazing material. Attention is invited to the fact that the protective plating on the tip makes it possible to carry out this method in an oxidizing atmosphere, as the plating prevents the oxidation of the cutting tip at the higher temperatures. This method also makes it possible to braze or weld cutting tips of high oxidizable material to supporting members of inexpensive materials, with the same apparatus that is now used for brazing on cutting tips of low oxidizable metals.

Figure 2:
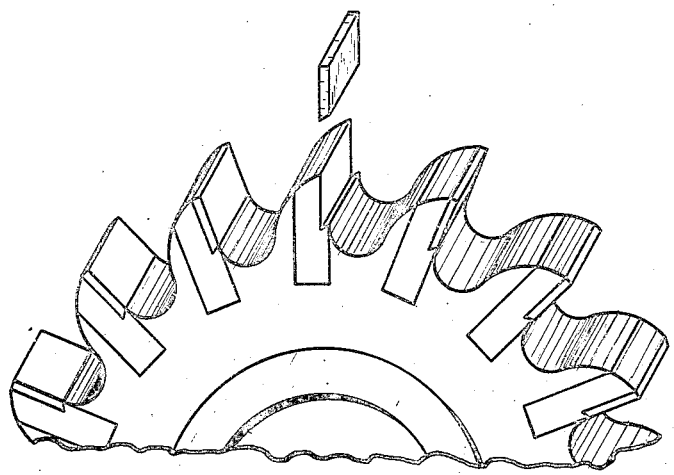
Figure 2 represents another type of cutting tool with the cutting tip detached.

Although this method has been illustrated in connection with a lathe tool, it is of course apparent that other tools, such as rotary cutters illustrated in Figure 2 or, in fact, any type of cutter, may have a cutting tip of high oxidizable material integrally affixed thereto by this method.

What is claimed is:

1. The method of making a cutting tool having a body portion and a cutting tip of high oxidizable metal, which consists in first covering the tip with a protective coating at ordinary temperatures to prevent oxidation thereof, then applying a solder and flux to the contiguous surfaces and assembling the parts, heating the parts to the temperature of the melting point of the solder, and finally pressing the parts together until the solder has set.

2. The method of making a cutting tool having a body portion and a cutting tip of high oxidizable metal, which consists in plating the tip with a metallic heat resisting coating at relatively low temperatures, applying a solder and flux to the contiguous surfaces of the parts, saturating the parts with heat in one zone, transferring the parts to a higher heat zone to melt the solder and flux, after which, subjecting the parts to pressure to set them and finally grinding the tool to remove the coating and sharpen it.

3. The method of forming a metal working tool composed of a body portion and a high speed cutting tip of relatively high oxidizable material which consists in enveloping the tip with a protective metallic coating by electrodeposition to prevent oxidation thereof during the uniting process at a relatively low temperature, applying a metallic solder between the parts, assembling the parts, subjecting the assembled parts to a first heat zone having a temperature lower than the melting point of the solder, then transferring the assembled parts to a higher heat zone having a temperature sufficient to melt the solder and finally subjecting the parts to pressure to unite them.

HENRY MARTIN STANLEY BINNS.